US012673517B2

(12) United States Patent
Hishikawa

(10) Patent No.: US 12,673,517 B2
(45) Date of Patent: Jul. 7, 2026

(54) RUBBER COMPOSITION FOR TIRE TREAD AND TIRE

(71) Applicant: Toyo Tire Corporation, Itami (JP)

(72) Inventor: Yasuhiro Hishikawa, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 545 days.

(21) Appl. No.: 18/127,685

(22) Filed: Mar. 29, 2023

(65) Prior Publication Data

US 2023/0331042 A1     Oct. 19, 2023

(30) Foreign Application Priority Data

Apr. 15, 2022    (JP) .................................. 2022-067795

(51) Int. Cl.
| | |
|---|---|
| *C08L 9/06* | (2006.01) |
| *B60C 1/00* | (2006.01) |
| *C08K 3/36* | (2006.01) |
| *C08K 5/548* | (2006.01) |
| *C08L 91/00* | (2006.01) |

(52) U.S. Cl.
CPC .............. *B60C 1/0016* (2013.01); *C08K 3/36* (2013.01); *C08K 5/548* (2013.01); *C08L 9/06* (2013.01); *C08L 91/00* (2013.01); *C08L 2205/025* (2013.01); *C08L 2205/03* (2013.01)

(58) Field of Classification Search
CPC ... C08L 9/06; C08L 91/00; C08K 3/36; B60C 1/00
USPC ........................................................ 523/156
See application file for complete search history.

(56) References Cited

U.S. PATENT DOCUMENTS

| | | | | |
|---|---|---|---|---|
| 5,281,671 | A | * | 1/1994 | Suzuki ...................... C08L 9/00 |
| | | | | 525/215 |
| 2013/0296471 | A1 | | 11/2013 | Lesage et al. |
| 2017/0174876 | A1* | | 6/2017 | Maejima ................... C08L 9/00 |
| 2018/0163028 | A1 | | 6/2018 | Brace |
| 2018/0163029 | A1 | | 6/2018 | Brace |

FOREIGN PATENT DOCUMENTS

| | | | |
|---|---|---|---|
| EP | 3808569 | A1 | 4/2021 |
| JP | 2014-503619 | A | 2/2014 |
| JP | 2018-123305 | A | 8/2018 |
| JP | 2021-088627 | A | 6/2021 |
| JP | 2021-134249 | A | 9/2021 |

OTHER PUBLICATIONS

Hao et al., "Study of two types of styrene butadiene rubber in tire tread compounds," Polymer Testing. pp. 539-544. 2001 (Year: 2001).*
https://www.yschem.co.jp/english/products/resin/aromatic_modified_terpene.html (Year: 2014).*
Office Action dated Mar. 3, 2026, issued in counterpart JP Application No. 2022-067795, with English translation.(12 pages).

* cited by examiner

*Primary Examiner* — Deve V Hall

(74) *Attorney, Agent, or Firm* — WHDA, LLP

(57) ABSTRACT

A rubber composition for a tire tread according to an embodiment includes, per 100 parts by mass of a diene rubber including 30 to 85 parts by mass of a styrene butadiene rubber and 15 to 70 parts by mass of a butadiene rubber and having an average glass transition temperature of −57° C. or less: 90 to 150 parts by mass of silica; 5 to 30 parts by mass of an oil; and 10 parts by mass or more and less than 40 parts by mass of a thermoplastic resin having a softening point of 40° C. or more. In the rubber composition, the total content of the oil and the thermoplastic resin is less than 45 parts by mass, and the oil content is less than 20 parts by mass per 100 parts by mass of silica.

18 Claims, No Drawings

RUBBER COMPOSITION FOR TIRE TREAD AND TIRE

BACKGROUND OF THE INVENTION

1. Field of the Invention

The present invention relates to a rubber composition for a tire tread and also to a tire using the same.

2. Description of Related Art

One of the performances required for tires is grip performance on wet road surfaces (i.e., wet performance). In order to improve wet performance, it is known to blend a large amount of silica as a filler and also increase the amounts of resin and oil.

For example, JP2014-503619A describes a rubber composition containing, per 100 parts by mass of a diene rubber including an SBR having a certain functional group, 100 to 160 parts by mass of an inorganic filler containing silica, 5 to 60 parts by mass of a hydrocarbon resin having a glass transition temperature of more than 20° C., and 5 to 60 parts by mass of a liquid plasticizer. In the rubber composition, the total content of the hydrocarbon resin and the liquid plasticizer is set at more than 45 parts by mass. It is described that because of the above configuration, according to JP2014-503619A, both low rolling resistance and wet performance can be achieved.

SUMMARY OF THE INVENTION

As described above, when a large amount of silica is blended, and the amounts of resin and oil are increased accordingly, wet performance can be improved. However, it has been found that when the amounts of silica, resin, and oil are increased, the diene rubber proportion in the rubber composition decreases, resulting in a decrease in breaking strength. For example, when applied to a winter tire that requires grip performance on snowy roads (i.e., snow performance), because winter tires have small-sized tread blocks, maintenance of breaking strength becomes an issue.

In view of the above points, an object of some embodiments of the invention is to provide a rubber composition for a tire tread, which can satisfy wet performance, snow performance, and breaking strength, and also a tire using the same.

The invention encompasses the following embodiments.

[1] A rubber composition for a tire tread, including, per 100 parts by mass of a diene rubber including 30 to 85 parts by mass of a styrene butadiene rubber and 15 to 70 parts by mass of a butadiene rubber and having an average glass transition temperature of –57° C. or less:

90 to 150 parts by mass of silica;

5 to 30 parts by mass of an oil; and 10 parts by mass or more and less than 40 parts by mass of a thermoplastic resin having a softening point of 40° C. or more, wherein the total content of the oil and the thermoplastic resin is less than 45 parts by mass, and the content of the oil is 20 parts by mass or less per 100 parts by mass of the silica.

[2] The rubber composition for a tire tread according to [1], further including 5 to 20 parts by mass of a thioester group-containing silane coupling agent per 100 parts by mass of the silica.

[3] The rubber composition for a tire tread according to [1] or [2], wherein the styrene butadiene rubber includes a modified solution-polymerized styrene butadiene rubber.

[4] A tire having a tread made using the rubber composition for a tire tread according to any of the above [1] to [3].

According to an embodiment of the invention, a rubber composition for a tire tread, which can satisfy wet performance, snow performance, and breaking strength, can be provided.

DESCRIPTION OF EMBODIMENTS

A rubber composition for a tire tread according to this embodiment (hereinafter also referred to as "rubber composition") includes (A) a diene rubber, (B) silica, (C) an oil, and (D) a thermoplastic resin.

[(A) Diene Rubber]

In this embodiment, a diene rubber as a rubber component contains a styrene butadiene rubber (SBR) and a butadiene rubber (BR). Here, a diene rubber refers to a rubber with a repeating unit corresponding to a diene monomer having a conjugated double bond, and has a double bond in the polymer backbone.

The styrene butadiene rubber may be a solution-polymerized styrene butadiene rubber (SSBR), an emulsion-polymerized styrene butadiene rubber (ESBR), a modified styrene butadiene rubber (modified SBR) that has been modified at the terminal, backbone, or the like, or an unmodified styrene butadiene rubber that has not been modified. It is preferable that the styrene butadiene rubber includes a modified solution-polymerized styrene butadiene rubber (modified SSBR).

As a modified SBR (preferably modified SSBR), an SBR having a functional group introduced at the terminal and/or backbone and thus modified with the functional group is used. The functional group preferably contains an oxygen atom and/or a nitrogen atom and may be, for example, at least one selected from the group consisting of an amino group, a hydroxy group, an alkoxy group, an epoxy group, and a carboxy group. As a result of using such a modified SBR, the dispersibility of silica can be improved.

The glass transition temperature (Tg) of the styrene butadiene rubber is not particularly limited and may be, for example, –80 to –10° C., or –70 to –50° C. In addition, it is also possible to use two or more kinds of styrene butadiene rubbers having different glass transition temperatures in combination.

As used herein, the glass transition temperature is a value measured in accordance with JIS K7121:2012 by a differential scanning calorimetry (DSC) method at a temperature rise rate of 20° C./min (measurement temperature range: –150° C. to 50° C.).

The butadiene rubber can be any of various butadiene rubbers generally used for rubber compositions for tires, and may be a modified butadiene rubber (modified BR) that has been modified at the terminal, backbone, or the like or an unmodified butadiene rubber that has not been modified.

In one embodiment, a high-cis BR having a cis-1,4 bond content of 90 mass % or more is preferably used as the butadiene rubber. The cis-1,4 bond content in a high-cis BR is more preferably 96 mass % or more.

As the high-cis BR, preferably, a butadiene rubber polymerized using a neodymium (Nd)-based catalyst may be used. The neodymium-based catalyst may be neodymium alone, a compound of neodymium with other metals, or an organic compound containing neodymium. As specific examples of neodymium-based catalysts, $NdCl_3$, $Et-NdCl_2$, and the like can be mentioned. A butadiene rubber polymerized using a neodymium-based catalyst has a microstructure with a high cis content and a low vinyl content. For example, in the microstructure, it is preferable that the cis-1,4 bond content is 96 mass % or more, and the vinyl group (1,2-vinyl bond) content is 1.0 mass % or less.

As used herein, the cis-1,4 bond content and the vinyl group content are values calculated from the integral ratio of the $^1$H-NMR spectrum.

In this embodiment, the diene rubber may be composed only of the styrene butadiene rubber and butadiene rubber described above, or may also contain other diene rubbers. As specific examples of other diene rubbers, a natural rubber (NR), a synthetic isoprene rubber (IR), a nitrile rubber (NBR), a chloroprene rubber (CR), and the like can be mentioned. They may be used alone, and it is also possible to use two or more kinds in combination. The concept of these other diene rubbers also encompasses those modified at the terminal, backbone, or the like as necessary and those modified to impart desired characteristics (e.g., modified NR).

In this embodiment, 100 parts by mass of the diene rubber includes 30 to 85 parts by mass of a styrene butadiene rubber and 15 to 70 parts by mass of a butadiene rubber. It is preferable that 100 parts by mass of the diene rubber includes 50 to 85 parts by mass of a styrene butadiene rubber and 15 to 50 parts by mass of a butadiene rubber. It is more preferable that 100 parts by mass of the diene rubber includes 60 to 85 parts by mass of a styrene butadiene rubber and 15 to 40 parts by mass of a butadiene rubber. It is still more preferable that 100 parts by mass of the diene rubber includes 70 to 80 parts by mass of a styrene butadiene rubber and 20 to 30 parts by mass of a butadiene rubber.

In one embodiment, 100 parts by mass of the diene rubber may include, as at least part of the styrene butadiene rubber, 30 to 85 parts by mass, 40 to 80 parts by mass, or 45 to 65 parts by mass of a modified SSBR. In this case, the styrene butadiene rubber may be composed only of a modified SSBR, and it is also possible to use a modified SSBR in combination with an unmodified SBR.

In one preferred embodiment, 100 parts by mass of the diene rubber may include 40 to 70 parts by mass (preferably 50 to 60 parts by mass) of a modified SSBR having a Tg of −75 to −45° C. (preferably −70 to −50° C.), 10 to 30 parts by mass (preferably 15 to 25 parts by mass) of an unmodified SBR having a Tg of −80 to −50° C. (preferably −75 to −60° C.), and 15 to 40 parts by mass (preferably 20 to 30 parts by mass) of a butadiene rubber (preferably high-cis BR).

In another embodiment, 100 parts by mass of the diene rubber may include 15 to 45 parts by mass (preferably 25 to 35 parts by mass) of a modified SSBR having a Tg of −40 to −10° C. (preferably −30 to −20° C.), 35 to 65 parts by mass (preferably 45 to 55 parts by mass) of a modified SSBR having a Tg of −75 to −45° C. (preferably −70 to −50° C.), and 15 to 35 parts by mass (preferably 15 to 25 parts by mass) of a butadiene rubber (preferably high-cis BR).

In this embodiment, the diene rubber has an average glass transition temperature (hereinafter referred to as "average Tg") of −57° C. or less. When the average Tg of the diene rubber is −57° C. or less, the balance between wet performance and snow performance can be improved. The average Tg of the diene rubber is more preferably −70° C. or lower. The lower limit of the average Tg is not particularly set and may be, for example, −90° C. or more, or −80° C. or more.

The average Tg of a diene rubber is the average value calculated, using the glass transition temperature of each rubber that constitutes the diene rubber as a rubber component and the mass proportion of each rubber in the diene rubber, by weighted averaging the glass transition temperatures based on the mass proportions. Specifically, the average Tg is calculated by $\Sigma\{$(glass transition temperature of each rubber)×(mass proportion of each rubber)$\}$. Here, the mass proportion of each rubber=(parts by mass of each rubber per 100 parts by mass of the diene rubber)/100.

[(B) Silica]

The rubber composition according to this embodiment has blended therein silica as a filler. As silica, for example, it is preferable to use wet silica, such as wet-precipitated silica or wet-gelled silica.

The nitrogen adsorption specific surface area ($N_2SA$) of silica is not particularly limited and may be, for example, 100 to 300 $m^2/g$, 150 to 250 $m^2/g$, or 180 to 220 $m^2/g$. The nitrogen adsorption specific surface area of silica is a BET specific surface area measured in accordance with the BET Method described in JIS K6430:2008.

The silica content is 90 to 150 parts by mass per 100 parts by mass of the diene rubber. When the silica content is 90 parts by mass or more, wet performance can be improved. In addition, when the content is 150 parts by mass or less, a decrease in breaking strength can be suppressed. The silica content is, per 100 parts by mass of the diene rubber, preferably 100 to 140 parts by mass, and more preferably 110 to 130 parts by mass.

The filler to be blended into the rubber composition may be silica alone, and it is also possible to blend carbon black together with silica. The filler preferably contains silica in a proportion of 90 mass % or more, more preferably 95 mass % or more. The carbon black content is not particularly limited and may be, per 100 parts by mass of the diene rubber, 10 parts by mass or less, or 5 parts by mass or less.

[(C) Oil]

The rubber composition according to this embodiment has blended therein an oil. As an oil, for example, a mineral oil such as paraffinic oil, naphthenic oil, and aromatic oil, a vegetable oil such as linseed oil, safflower oil, soybean oil, corn oil, castor oil, rapeseed oil, and cottonseed oil, and the like can be mentioned. They can be used alone, and it is also possible to use a combination of two or more kinds.

The oil content is, per 100 parts by mass of the diene rubber, 5 to 30 parts by mass, more preferably 10 to 25 parts by mass, and still more preferably 12 to 20 parts by mass. Incidentally, when an oil-extended rubber is used as the diene rubber, the oil content also includes the amount of oil contained in the oil-extended rubber.

[(D) Thermoplastic Resin]

The rubber composition according to this embodiment has blended therein a thermoplastic resin having a softening point of 40° C. or more. As the thermoplastic resin, for example, a terpene-based resin, a styrene-based resin, a petroleum resin, a rosin-based resin, a coumarone-based resin, and the like can be mentioned. They may be used alone, and it is also possible to use two or more kinds in combination.

A terpene-based resin is a resin obtained by polymerizing a terpene monomer such as α-pinene, β-pinene, limonene, or dipentene. Examples of terpene-based resins include polyterpene resins produced using only a terpene monomer, as well as terpene phenolic resins, aromatic modified terpene resins, and the like.

In one embodiment, the terpene-based resin is preferably a polyterpene resin containing a β-pinene unit, and may also be a polyterpene resin containing an α-pinene unit and a β-pinene unit. For example, an α-pinene/β-pinene mixed resin obtained by polymerizing a mixture of α-pinene and β-pinene may be used. In the α-pinene/β-pinene mixed resin, the mass ratio between the α-pinene unit and the β-pinene unit is not particularly limited, but is preferably 35:65 to 4:96, more preferably 20:80 to 4:96, and still more preferably 10:90 to 4:96. Here, an α-pinene unit is a unit derived from α-pinene, and a β-pinene unit is a unit derived from β-pinene.

As styrene-based resins, for example, polystyrene, α-methylstyrene homopolymers, styrene/α-methylstyrene copolymers, styrene-based monomer/aliphatic monomer copolymers, α-methylstyrene/aliphatic monomer copolymers, styrene-based monomer/α-methylstyrene/aliphatic monomer copolymers, and the like can be mentioned.

As petroleum resins, for example, aliphatic petroleum resins (C5-based petroleum resins), aromatic petroleum resins (C9-based petroleum resins), and aliphatic/aromatic copolymer petroleum resins (C5/C9-based petroleum resins) can be mentioned. A C5-based petroleum resin is a resin obtained by the cationic polymerization of an unsaturated monomer such as isoprene or cyclopentadiene, which is a petroleum fraction equivalent to four to five carbon atoms (C5 fraction), and may also be hydrogenated. A C9-based petroleum resin is a resin obtained through copolymerization by the cationic polymerization of a monomer such as vinyltoluene, an alkylstyrene, or indene, which is a petroleum fraction equivalent to eight to ten carbon atoms (C9 fraction), and may also be hydrogenated. A C5/C9-based petroleum resin is a resin obtained by the copolymerization of the above C5 fraction and C9 fraction, and may also be hydrogenated.

As rosin-based resins, for example, natural resin rosin, rosin-modified resins (e.g., rosin-modified maleic acid resin) obtained by modifying such rosin by hydrogenation, disproportionation, dimerization, esterification, etc., and the like can be mentioned.

A coumarone-based resin is a resin containing coumarone as a main component, and, for example, coumarone resins, coumarone-indene resins, copolymer resins containing coumarone, indene, and styrene as main components, and the like can be mentioned.

As a thermoplastic resin, one having a softening point of 40° C. or more as described above is used. The softening point of the thermoplastic resin is preferably 60° C. or more, more preferably 80° C. or more, and still more preferably 100° C. or more. The upper limit of the softening point may be, for example, 160° C. or less, or 150° C. or less.

As used herein, the softening point of a thermoplastic resin is a value measured using a ring and ball softening point measuring apparatus in accordance with JIS K6220-1:2001.

The thermoplastic resin content is, per 100 parts by mass of the diene rubber, 10 parts by mass or more and less than 40 parts by mass, more preferably 15 to 35 parts by mass, and still more preferably 20 to 30 parts by mass.

In the rubber composition according to this embodiment, the total content of the oil and thermoplastic resin described above is set at less than 45 parts by mass per 100 parts by mass of the diene rubber, and the oil content set at 20 parts by mass or less per 100 parts by mass of silica. As described above, in this embodiment, a large amount of silica is blended in order to improve wet performance. In that case, in ordinary circumstances, in order to maintain the same level of rubber hardness, and also in consideration of processability and the like, an oil and a thermoplastic resin acting as plasticizers are increased in amount. However, an increase in the amounts of oil and thermoplastic resin leads to a decrease in breaking strength. In contrast, in this embodiment, with the amount of oil being set at 20 mass % or less of the amount of silica, the total content of the oil and the thermoplastic resin is set at less than 45 parts by mass. As a result, breaking strength can be improved while maintaining excellent wet performance and snow performance.

The total content of the oil and the thermoplastic resin is, per 100 parts by mass of the diene rubber, preferably 30 to 44 parts by mass, more preferably 35 to 44 parts by mass, and still more preferably 40 to 44 parts by mass.

The ratio of the amount of oil to the amount of silica, that is, the oil content per 100 parts by mass of silica, is preferably 5 to 20 parts by mass, more preferably 8 to 18 parts by mass, and still more preferably 10 to 17 parts by mass.

The ratio of the amount of thermoplastic resin to the amount of silica, that is, the thermoplastic resin content per 100 parts by mass of silica, is not particularly limited and may be, for example, 10 to 30 parts by mass, 15 to 28 parts by mass, or 20 to 25 parts by mass.

[(E) Silane Coupling Agent]

It is preferable that the rubber composition according to this embodiment has blended therein a silane coupling agent. As silane coupling agents, for example, sulfide silane coupling agents such as bis(3-triethoxysilylpropyl)tetrasulfide, bis(3-triethoxysilylpropyl)disulfide, bis(2-triethoxysilylethyl)tetrasulfide, bis(4-triethoxysilylbutyl)disulfide, bis(3-trimethoxysilylpropyl)tetrasulfide, and bis(2-trimethoxysilylethyl)disulfide, mercaptosilane coupling agents such as 3-mercaptopropyltrimethoxysilane, 3-mercaptopropyltriethoxysilane, 3-mercaptopropylmethyldimethoxysilane, 3-mercaptopropyldimethylmethoxysilane, and mercaptoethyltriethoxysilane, and thioester group-containing silane coupling agents such as 3-octanoylthio-1-propyltriethoxysilane, 3-propionylthiopropyltrimethoxysilane, 3-hexanoylthio-1-propyltriethoxysilane, and 3-octanoyl-thio-1-propyltrimethoxysilane can be mentioned. They can be used alone, and it is also possible to use a combination of two or more kinds. Among them, a thioester group-containing silane coupling agent is preferably used from the viewpoint of enhancing the effect according to this embodiment.

The silane coupling agent (preferably thioester group-containing silane coupling agent) content is, per 100 parts by mass of silica, preferably 5 to 20 parts by mass, and more preferably 5 to 15 parts by mass.

[Other Components]

In addition to the above components, the rubber composition according to this embodiment may have blended therein various additives generally used in rubber compositions, such as zinc oxide, stearic acid, a wax, an antioxidant, a processing aid, a vulcanizing agent, and a vulcanization accelerator.

The zinc oxide content is not particularly limited and may be, for example, per 100 parts by mass of the diene rubber, 0 to 10 parts by mass, 0.5 to 5 parts by mass, or 1 to 4 parts by mass.

The stearic acid content is not particularly limited and may be, for example, per 100 parts by mass of the diene rubber, 0 to 10 parts by mass, 0.5 to 5 parts by mass, or 1 to 4 parts by mass.

The wax content is not particularly limited and may be, for example, per 100 parts by mass of the diene rubber, 0 to 10 parts by mass, 0.5 to 5 parts by mass, or 1 to 4 parts by mass.

As an antioxidant, for example, amine-ketone-based, aromatic secondary amine-based, monophenol-based, bisphenol-based, benzimidazole-based, and like various antioxidants can be mentioned. They can be used alone, and it is also possible to use a combination of two or more kinds. The antioxidant content is not particularly limited and may be, for example, per 100 parts by mass of the diene rubber, 0 to 10 parts by mass, 0.5 to 5 parts by mass, or 1 to 4 parts by mass.

The processing aid content is not particularly limited and may be, for example, per 100 parts by mass of the diene rubber, 0 to 10 parts by mass, or 1 to 5 parts by mass.

As a vulcanizing agent, sulfur is preferably used. The vulcanizing agent content is not particularly limited and may be, per 100 parts by mass of the diene rubber, 0.1 to 10 parts by mass, 0.5 to 5 parts by mass, or 1 to 3 parts by mass.

As a vulcanization accelerator, for example, sulfenamide-based, guanidine-based, thiuram-based, thiazole-based, and like various vulcanization accelerators can be mentioned. They can be used alone, and it is also possible to use a combination of two or more kinds. The vulcanization accelerator content is not particularly limited and may be, per 100 parts by mass of the diene rubber, 0.1 to 10 parts by mass, or 1 to 5 parts by mass.

[Method of Preparing Rubber Composition]

The rubber composition according to this embodiment can be made by kneading in the usual manner using a commonly used mixer, such as a Banbury mixer, a kneader, or a roll. That is, for example, in the first mixing stage (non-productive kneading process), additives other than a vulcanizing agent and a vulcanization accelerator are added to a diene rubber together with silica, an oil, and a thermoplastic resin, and mixed. Next, in the final mixing stage (productive kneading step), a vulcanizing agent and a vulcanization accelerator are added to the obtained mixture and mixed. As a result, an unvulcanized rubber composition can be prepared.

[Application of Rubber Composition]

The rubber composition according to this embodiment can be used as a rubber composition for a tire tread. As tires, pneumatic tires of various sizes for various applications, including passenger car tires, heavy-duty tires for trucks and buses, and the like, can be mentioned.

In one embodiment, the rubber composition is preferably used as a tread rubber constituting the contact patch of an all-season tire or a winter tire. Compared to summer tires, these tires have more sipes in the tread blocks, and the rubber blocks of such a tire are flexible even in ice and snow.

A tire according to one embodiment is a tire having a tread made using the above rubber composition. That is, a tire according to one embodiment has a tread rubber made of the above rubber composition.

Some tire tread rubbers have a two-layer structure composed of a cap rubber and a base rubber, while others have a single-layer structure having the two integrated. In the case of a single-layer structure, the tread rubber may be formed from the above rubber composition. In the case of a two-layer structure, the outer cap rubber contacting the road surface may be formed from the above rubber composition, the base rubber arranged on the inner side of the cap rubber may be formed from the above rubber composition, or both the cap rubber and the base rubber may be formed from the above rubber composition.

The method for producing a tire is not particularly limited. For example, the above rubber composition is formed into a predetermined shape by extrusion in the usual manner to give an unvulcanized tread rubber member. The tread rubber member is combined with other tire members to make an unvulcanized tire (green tire). Subsequently, vulcanization molding is performed at 140 to 180° C., for example, whereby a tire can be produced.

EXAMPLES

Examples will be shown hereinafter, but the invention is not limited to these examples.

Components used in the examples and comparative examples are as follows.

SBR 1: Modified SSBR, Tg=−60° C., "HPR840" manufactured by JSR Corporation

SBR 2: Modified SSBR, Tg=−24° C., "HPR850" manufactured by JSR Corporation

SBR 3: Unmodified SSBR, Tg=−70° C., 37.5 parts by mass of an oil-extended product based on 100 parts by mass of the rubber content, "TUFDENE 1834" manufactured by Asahi Kasei Corporation BR: High-cis BR polymerized using an Nd-based catalyst, Tg=−102° C., cis-1,4 bond content=97 mass, vinyl group content=0.9 mass %, "BR730" manufactured by JSR Corporation Carbon black: N339, "SEAST KH" manufactured by Tokai Carbon Co., Ltd.

Silica: $N_2SA$=205 m²/g, "Nipsil AQ" manufactured by Tosoh Silica Corporation

Silane coupling agent 1: Bis(3-triethoxysilylpropyl)disulfide, "Si75" manufactured by Evonik Silane coupling agent 2: 3-Octanoylthio-1-propyltriethoxysilane, "NXT" manufactured by Momentive Performance Materials Oil: "PROCESS NC140" manufactured by ENEOS Corporation Terpene-based resin: α-Pinene/β-pinene mixed resin, "SYLVATRAXX 4150" manufactured by Kraton (α-pinene unit: 5 mass %, β-pinene unit: 95 mass %, softening point: 115° C.)

Styrene-based resin: "SYLVATRAXX 4401" manufactured by Kraton, softening point=85° C.

Petroleum resin: "Petrotack 90" manufactured by Tosoh Corporation, softening point=100° C.

Wax: "OZOACE 0355" manufactured by Nippon Seiro Co., Ltd.

Stearic acid: "Beads Stearic Acid" manufactured by NOF Corporation

Zinc oxide: "Type 2 Zinc Oxide" manufactured by Mitsui Mining & Smelting Co., Ltd.

Antioxidant 1: Aromatic secondary amine-based (6PPD), "Nocrac 6C" manufactured by Ouchi Shinko Chemical Industrial Co., Ltd.

Antioxidant 2: Amine-ketone-based (TMQ), "ANTAGE RD" manufactured by Kawaguchi Chemical Industry Co., Ltd.

Processing aid: "Aflux 16" manufactured by LANXESS

Vulcanization accelerator 1: Guanidine-based (DPG), "Nocceler D" manufactured by Ouchi Shinko Chemical Industrial Co., Ltd.

Vulcanization accelerator 2: Sulfenamide-based (CBS), "SOXINOL CZ" manufactured by Sumitomo Chemical Co., Ltd.

Sulfur: "Powder Sulfur" manufactured by Tsurumi Chemical Industry Co., Ltd.

The evaluation methods in the examples and comparative examples are as follows.

9

(1) Wet Performance

A prototype tire was mounted on a vehicle, and run on a road surface with a water depth of 1 mm at a speed of 100 km/h under 25° C. temperature conditions. ABS was then activated, the braking distance until the vehicle stopped was measured. The reciprocals of the measured values were calculated, and expressed as indexes taking the calculated values in Comparative Example 1 in Table 1, Comparative Example 3 in Table 2, Comparative Example 4 in Table 3, and Comparative Example 5 in Table 4, respectively, as 100. The larger the index, the shorter the braking distance, indicating better wet performance.

(2) Snow Performance

A prototype tire was mounted on a vehicle, and run on a snowy road at a speed of 60 km/h under −10° C. temperature conditions. ABS was then activated, and the braking distance until the speed dropped to 20 km/h was measured. The reciprocals of the measured values were calculated, and expressed as indexes taking the calculated values in Comparative Example 1 in Table 1, Comparative Example 3 in Table 2, Comparative Example 4 in Table 3, and Comparative Example 5 in Table 4, respectively, as 100. The larger the index, the shorter the braking distance, indicating better snow performance.

(3) Breaking Strength

Using a test piece, a tensile test (No. 3 dumbbell) was performed in accordance with JIS K6251:2017 to measure the tensile strength. The results were expressed as indexes taking the measured values in Comparative Example 1 in Table 1, Comparative Example 3 in Table 2, Comparative Example 4 in Table 3, and Comparative Example 5 in Table 4, respectively, as 100. The larger the index, the higher the breaking strength, indicating better reinforcing properties.

First Experiment Example

Using a Banbury mixer, following the formulations (parts by mass) shown in Table 1 below, first, in the first excluding sulfur and mixing stage, ingredients a vulcanization accelerator were added to a diene rubber and kneaded (discharge temperature=155° C.). Next, in the final mixing stage, sulfur and a vulcanization accelerator were added to the obtained kneaded product and kneaded (discharge temperature=90° C.) to prepare a rubber composition.

With respect to the amount of SBR 3 in the tables, the amount in parentheses is the rubber content. "Oil/Silica" in the tables is the ratio of the parts by mass of oil to the parts by mass of silica, and the parts by mass of oil also includes the amount of oil for oil extension contained in SBR 3. "Resin/Silica" in the tables is the ratio of the parts by mass of thermoplastic resin (terpene-based resin, styrene-based resin, petroleum resin) to the parts by mass of silica.

The obtained unvulcanized rubber composition was vulcanized at 170° C.×15 minutes to prepare a test piece, and the breaking strength was evaluated. In addition, using the unvulcanized rubber composition as a tread rubber, a radial pneumatic winter tire (tire size: 205/55R16) was made by vulcanization molding in the usual manner. The obtained prototype tire was evaluated for wet performance and snow performance.

TABLE 1

| | Example 1 | Example 2 | Example 3 | Comparative Example 1 | Comparative Example 2 |
|---|---|---|---|---|---|
| Formulation (parts by mass) | | | | | |
| SBR 1 (Tg: −60° C.) | 55 | 55 | 55 | 55 | 55 |
| SBR 3 (Tg: −70° C.) | 27.5 | 27.5 | 27.5 | 27.5 | 27.5 |
| | (20) | (20) | (20) | (20) | (20) |
| BR (Tg: −102° C.) | 25 | 25 | 25 | 25 | 25 |
| Carbon black | 5 | 5 | 5 | 5 | 5 |
| Silica | 110 | 110 | 110 | 110 | 85 |
| Silane coupling agent 1 | 8.8 | 8.8 | 8.8 | 8.8 | 6.4 |
| Oil | 9.5 | 9.5 | 9.5 | 17.5 | 11 |
| Terpene-based resin | 25 | — | — | 25 | 18 |
| Styrene-based resin | — | 25 | — | — | — |
| Petroleum resin | — | — | 25 | 1 | 1 |
| Wax | 2 | 2 | 2 | 2 | 2 |
| Stearic acid | 2 | 2 | 2 | 2 | 2 |
| Zinc oxide | 2 | 2 | 2 | 2 | 2 |
| Antioxidant 1 | 2 | 2 | 2 | 2 | 2 |
| Antioxidant 2 | 2 | 2 | 2 | 2 | 2 |
| Processing aid | 3 | 3 | 3 | 3 | 3 |
| Vulcanization accelerator 1 | 3 | 3 | 3 | 3 | 3 |
| Vulcanization accelerator 2 | 2 | 2 | 2 | 2 | 2 |
| Sulfur | 2 | 2 | 2 | 2 | 2 |
| Diene rubber's average Tg (° C.) | −72.5 | −72.5 | −72.5 | −72.5 | −72.5 |
| Total amount of oil and resin (parts by mass) | 42 | 42 | 42 | 50 | 36.5 |
| Oil/Silica | 0.155 | 0.155 | 0.155 | 0.227 | 0.231 |
| Resin/Silica | 0.227 | 0.227 | 0.227 | 0.227 | 0.225 |
| Evaluation (Index) | | | | | |
| Wet performance | 103 | 102 | 100 | 100 | 90 |
| Snow performance | 100 | 101 | 101 | 100 | 103 |
| Breaking strength | 112 | 110 | 108 | 100 | 120 |

11

The results are as shown in Table 1. In Comparative Example 1, where the amount of silica was increased relative to Comparative Example 2, wet performance improved, but breaking strength decreased. In contrast, in Examples 1 to 3, where the total amount of oil and thermoplastic resin and the ratio of the amount of oil to the amount of silica were set within specific ranges, while maintaining or improving the excellent wet performance resulting from increasing the amount of silica, it was possible to maintain excellent snow performance and improve breaking strength relative to Comparative Example 1.

Second Experiment Example

A rubber composition was prepared in the same manner as in the first experiment example, except for following the formulations (parts by mass) shown in Table 2 below. Using the obtained rubber composition, a test piece and a prototype tire were made in the same manner as in the first experiment example, and evaluated for wet performance, snow performance, and breaking strength. The results are as shown in Table 2.

TABLE 2

| | Example 4 | Comparative Example 3 |
|---|---|---|
| Formulation (parts by mass) | | |
| SBR 1 (Tg: −60° C.) | 55 | 55 |
| SBR 3 (Tg: −70° C.) | 27.5 (20) | 27.5 (20) |
| BR (Tg: −102° C.) | 25 | 25 |
| Carbon black | 5 | 5 |
| Silica | 125 | 125 |
| Silane coupling agent 1 | 10 | 10 |
| Oil | 8.5 | 20.5 |
| Terpene-based resin | 28 | 28 |
| Wax | 2 | 2 |
| Stearic acid | 2 | 2 |
| Zinc oxide | 2 | 2 |
| Antioxidant 1 | 2 | 2 |
| Antioxidant 2 | 2 | 2 |
| Processing aid | 3 | 3 |
| Vulcanization accelerator 1 | 3 | 3 |
| Vulcanization accelerator 2 | 2 | 2 |
| Sulfur | 2 | 2 |
| Diene rubber's average Tg (° C.) | −72.5 | −72.5 |
| Total amount of oil and resin (parts by mass) | 44 | 56 |
| Oil/Silica | 0.128 | 0.224 |
| Resin/Silica | 0.224 | 0.224 |
| Evaluation (Index) | | |
| Wet performance | 103 | 100 |
| Snow performance | 100 | 100 |
| Breaking strength | 120 | 100 |

Third Experiment Example

A rubber composition was prepared in the same manner as in the first experiment example, except for following the formulations (parts by mass) shown in Table 3 below. Using the obtained rubber composition, a test piece and a prototype tire were made in the same manner as in the first experiment example, and evaluated for wet performance, snow performance, and breaking strength. The results are as shown in Table 3.

12

TABLE 3

| Formulation (parts by mass) | Example 5 | Example 6 | Example 7 | Example 8 | Example 9 | Comparative Example 4 |
|---|---|---|---|---|---|---|
| SBR 1 (Tg: −60° C.) | 55 | 55 | 55 | 55 | 55 | 55 |
| SBR 3 (Tg: −70° C.) | 27.5 (20) | 27.5 (20) | 27.5 (20) | 27.5 (20) | 27.5 (20) | 27.5 (20) |
| BR (Tg: −102° C.) | 25 | 25 | 25 | 25 | 25 | 25 |
| Carbon black | 5 | 5 | 5 | 5 | 5 | 5 |
| Silica | 125 | 125 | 125 | 125 | 125 | 125 |
| Silane coupling agent 2 | 10 | 10 | 10 | 10 | 10 | 10 |
| Oil | 8.5 | 2.5 | 12.5 | 12.5 | 12.5 | 17.5 |
| Terpene-based resin | 28 | 34 | 24 | — | — | 28 |
| Styrene-based resin | — | — | — | 24 | — | — |
| Petroleum resin | — | — | — | — | 24 | — |
| Wax | 2 | 2 | 2 | 2 | 2 | 2 |
| Stearic acid | 2 | 2 | 2 | 2 | 2 | 2 |
| Zinc oxide | 2 | 2 | 2 | 2 | 2 | 2 |
| Antioxidant 1 | 2 | 2 | 2 | 2 | 2 | 2 |
| Antioxidant 2 | 2 | 2 | 2 | 2 | 2 | 2 |
| Processing aid | 3 | 3 | 3 | 3 | 3 | 3 |
| Vulcanization accelerator 1 | 3 | 3 | 3 | 3 | 3 | 3 |
| Vulcanization accelerator 2 | 2 | 2 | 2 | 2 | 2 | 2 |
| Sulfur | 2 | 2 | 2 | 2 | 2 | 2 |
| Diene rubber's average Tg (° C.) | −72.5 | −72.5 | −72.5 | −72.5 | −72.5 | −72.5 |
| Total amount of oil and resin (parts by mass) | 44 | 44 | 44 | 44 | 44 | 53 |
| Oil/Silica | 0.128 | 0.080 | 0.160 | 0.160 | 0.160 | 0.200 |
| Resin/Silica | 0.224 | 0.272 | 0.192 | 0.192 | 0.192 | 0.224 |
| Evaluation (Index) | | | | | | |
| Wet performance | 104 | 107 | 102 | 101 | 100 | 100 |
| Snow performance | 100 | 100 | 100 | 100 | 100 | 100 |
| Breaking strength | 110 | 115 | 106 | 105 | 105 | 100 |

Fourth Experiment Example

A rubber composition was prepared in the same manner as in the first experiment example, except for following the formulations (parts by mass) shown in Table 4 below. Using the obtained rubber composition, a test piece and a prototype tire were made in the same manner as in the first experiment example, and evaluated for wet performance, snow performance, and breaking strength. The results are as shown in Table 4.

TABLE 4

| | Example 10 | Example 11 | Comparative Example 5 |
|---|---|---|---|
| Formulation (parts by mass) | | | |
| SBR 2 (Tg: −24° C.) | 30 | 30 | 30 |
| SBR 1 (Tg: −60° C.) | 50 | 50 | 50 |
| BR (Tg: −102° C.) | 20 | 20 | 20 |
| Carbon black | 5 | 5 | 5 |

TABLE 4-continued

| | Example 10 | Example 11 | Comparative Example 5 |
|---|---|---|---|
| Silica | 125 | 125 | 125 |
| Silane coupling agent 2 | 10 | 10 | 10 |
| Oil | 16 | 16 | 25 |
| Terpene-based resin | 28 | 14 | 14 |
| Styrene-based resin | — | 14 | 14 |
| Wax | 2 | 2 | 2 |
| Stearic acid | 2 | 2 | 2 |
| Zinc oxide | 2 | 2 | 2 |
| Antioxidant 1 | 2 | 2 | 2 |
| Antioxidant 2 | 2 | 2 | 2 |
| Processing aid | 3 | 3 | 3 |
| Vulcanization accelerator 1 | 3 | 3 | 3 |
| Vulcanization accelerator 2 | 2 | 2 | 2 |
| Sulfur | 2 | 2 | 2 |
| Diene rubber's average Tg (° C.) | −57.6 | −57.6 | −57.6 |
| Total amount of oil and resin (parts by mass) | 44 | 44 | 53 |
| Oil/Silica | 0.128 | 0.128 | 0.200 |
| Resin/Silica | 0.224 | 0.224 | 0.224 |
| Evaluation (Index) | | | |
| Wet performance | 103 | 101 | 100 |
| Snow performance | 100 | 101 | 100 |
| Breaking strength | 108 | 106 | 100 |

As shown in Tables 1 to 4, in Examples 1 to 11 according to this embodiment, because of the specific combination of formulations, it was possible to satisfy wet performance, snow performance, and breaking strength.

Incidentally, with respect to the various numerical ranges described herein, the upper and lower limits thereof can be arbitrarily combined, and all such combinations are incorporated herein as preferred numerical ranges. In addition, the description of a numerical range "X to Y" means X or more and Y or less.

Although some embodiments of the invention have been described above, these embodiments are presented as examples and not intended to limit the scope of the invention. These embodiments can be implemented in other various modes, and, without departing from the gist of the invention, various omissions, substitutions, and changes can be made thereto. These embodiments, as well as omissions, substitutions, and changes thereto, etc., fall within the scope and gist of the invention, and also fall within the scope of the claimed invention and its equivalents.

What is claimed is:

1. A rubber composition for a tire tread, comprising, per 100 parts by mass of a diene rubber including 30 to 85 parts by mass of a styrene butadiene rubber and 15 to 70 parts by mass of a butadiene rubber and having an average glass transition temperature of −57° C. or less,
    90 to 150 parts by mass of silica;
    5 to 30 parts by mass of an oil; and
    10 parts by mass or more and less than 40 parts by mass of a thermoplastic resin having a softening point of 40° C. or more, wherein
    the total content of the oil and the thermoplastic resin is less than 45 parts by mass, and the content of the oil is 20 parts by mass or less per 100 parts by mass of the silica.

2. The rubber composition for a tire tread according to claim 1, further comprising 5 to 20 parts by mass of a thioester group-containing silane coupling agent per 100 parts by mass of the silica.

3. The rubber composition for a tire tread according to claim 1, wherein the styrene butadiene rubber includes a modified solution-polymerized styrene butadiene rubber.

4. The rubber composition for a tire tread according to claim 2, wherein the styrene butadiene rubber includes a modified solution-polymerized styrene butadiene rubber.

5. The rubber composition for a tire tread according to claim 1, wherein the butadiene rubber has a cis-1,4 bond content of 90 mass % or more.

6. The rubber composition for a tire tread according to claim 1, wherein the butadiene rubber has a cis-1,4 bond content of 96 mass % or more and a vinyl group content of 1.0 mass % or less.

7. A rubber composition for a tire tread, comprising, per 100 parts by mass of a diene rubber including 30 to 85 parts by mass of a styrene butadiene rubber and 15 to 70 parts by mass of a butadiene rubber and having an average glass transition temperature of −57° C. or less,
    90 to 150 parts by mass of silica;
    5 to 30 parts by mass of an oil; and
    10 parts by mass or more and less than 40 parts by mass of a thermoplastic resin having a softening point of 40° C. or more, wherein
    the total content of the oil and the thermoplastic resin is less than 45 parts by mass, and the content of the oil is 20 parts by mass or less per 100 parts by mass of the silica,
    wherein 100 parts by mass of the diene rubber includes:
    as the styrene butadiene rubber, 40 to 70 parts by mass of a modified solution-polymerized styrene butadiene rubber having a glass transition temperature of −75 to −45° C. and 10 to 30 parts by mass of an unmodified styrene butadiene rubber having a glass transition temperature of −80 to −50° C.; and
    15 to 40 parts by mass of the butadiene rubber.

8. A rubber composition for a tire tread, comprising, per 100 parts by mass of a diene rubber including 30 to 85 parts by mass of a styrene butadiene rubber and 15 to 70 parts by mass of a butadiene rubber and having an average glass transition temperature of −57° C. or less,
    90 to 150 parts by mass of silica;
    5 to 30 parts by mass of an oil; and
    10 parts by mass or more and less than 40 parts by mass of a thermoplastic resin having a softening point of 40° C. or more, wherein
    the total content of the oil and the thermoplastic resin is less than 45 parts by mass, and the content of the oil is 20 parts by mass or less per 100 parts by mass of the silica, wherein 100 parts by mass of the diene rubber includes:
    as the styrene butadiene rubber, 15 to 45 parts by mass of a modified solution-polymerized styrene butadiene rubber having a glass transition temperature of −40 to ~10° C. and 35 to 65 parts by mass of a modified solution-polymerized styrene butadiene rubber having a glass transition temperature of −75 to −45° C.; and
    15 to 35 parts by mass of the butadiene rubber.

9. The rubber composition for a tire tread according to claim 1, wherein the thermoplastic resin is at least one selected from the group consisting of a terpene-based resin, a styrene-based resin, a petroleum resin, a rosin-based resin, and a coumarone-based resin.

10. The rubber composition for a tire tread according to claim 1, wherein the content of the thermoplastic resin is 10 to 30 parts by mass per 100 parts by mass of the silica.

11. A tire having a tread made using the rubber composition for a tire tread according to claim 1.

12. A tire having a tread made using the rubber composition for a tire tread according to claim 2.

13. A tire having a tread made using the rubber composition for a tire tread according to claim 3.

14. A tire having a tread made using the rubber composition for a tire tread according to claim 4.

15. The tire according to claim 11, being an all-season tire.

16. The tire according to claim 11, being a winter tire.

17. A tire having a tread made using the rubber composition for a tire tread according to claim 7.

18. A tire having a tread made using the rubber composition for a tire tread according to claim 8.

\* \* \* \* \*